United States Patent [19]

Houser

[11] Patent Number: 4,979,774
[45] Date of Patent: Dec. 25, 1990

[54] DASHBOARD DEVICE RETRACTION SYSTEM

[76] Inventor: Gerald Houser, 5160 S. Damen Ave., Chicago, Ill. 60609

[21] Appl. No.: 341,784

[22] Filed: Apr. 21, 1989

[51] Int. Cl.$^5$ ............................................. A47B 81/03
[52] U.S. Cl. ........................................ 296/70; 312/7.1
[58] Field of Search .................. 296/70, 37.9; 312/7.1, 312/12, 319, 223, 321, 330.1; 248/27.1, 551; 307/10.1, 10.2

[56] References Cited

U.S. PATENT DOCUMENTS

| | | | |
|---|---|---|---|
| 2,441,575 | 5/1948 | Johnson | 312/22 X |
| 3,476,265 | 11/1969 | Powers | 312/223 X |
| 3,992,070 | 11/1976 | Dunn et al. | 312/22 X |
| 3,993,278 | 11/1976 | Race | 70/58 X |
| 4,028,913 | 6/1977 | Falk | 70/58 |
| 4,083,620 | 4/1978 | Burgin | 70/58 X |
| 4,248,069 | 2/1981 | Burbank | 70/160 |
| 4,586,761 | 5/1986 | Shimbara | 312/319 |
| 4,660,900 | 4/1987 | Paterlini | 312/7.1 |
| 4,687,172 | 8/1987 | Stillback | 248/551 |

*Primary Examiner*—Margaret A. Focarino
*Assistant Examiner*—Joseph D. Pape
*Attorney, Agent, or Firm*—Welsh & Katz, Ltd.

[57] ABSTRACT

Apparatus and circuitry are disclosed for moving an electrical device, such as a radio or a cassette player, within a vehicle dashboard. The device is movable from a rear position within the dashboard to a front position within the dashboard when the device is to be operated, and from the front position to the rear position within the dashboard when the device is to be deactivated and stored.

15 Claims, 2 Drawing Sheets

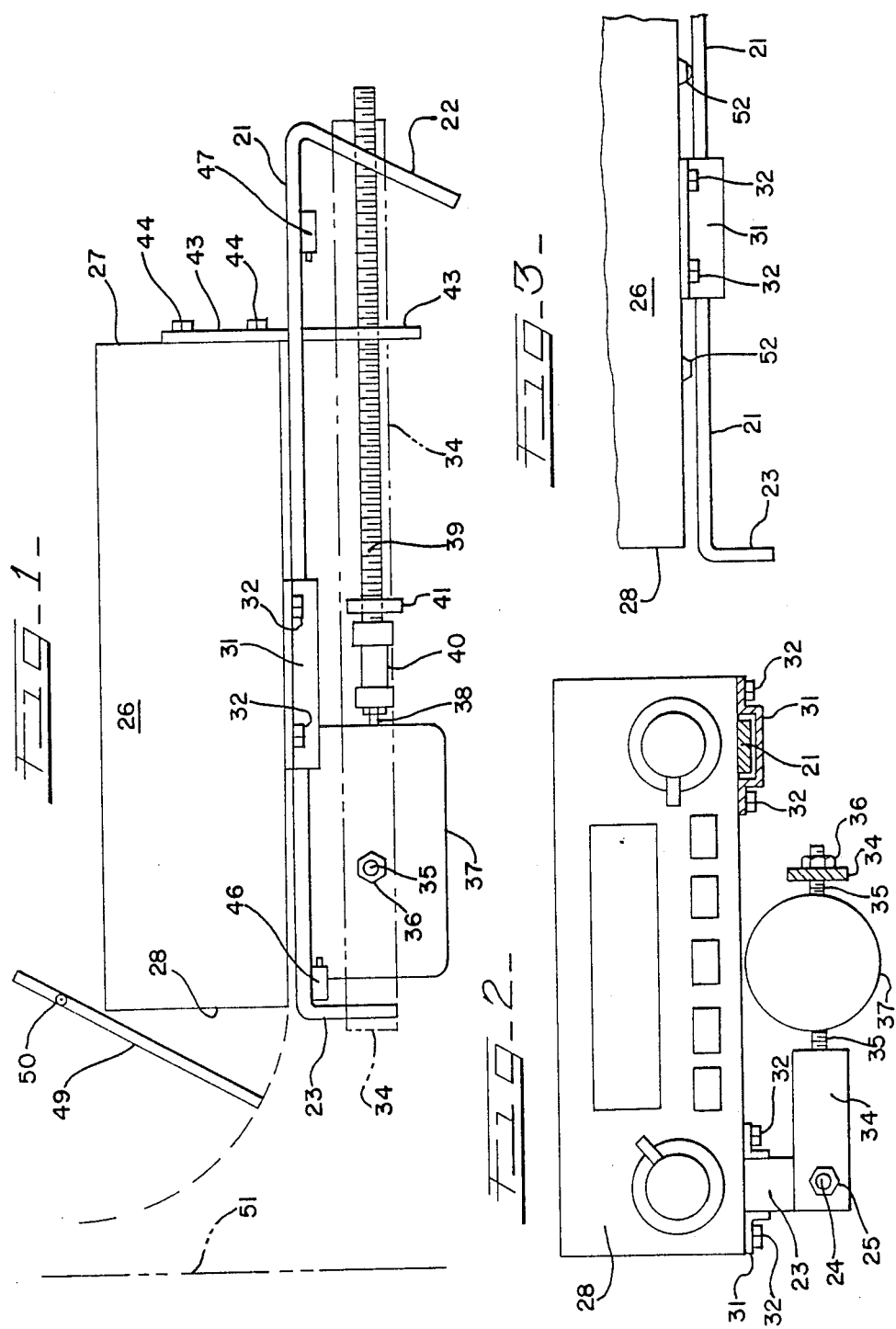

DASHBOARD DEVICE RETRACTION SYSTEM

BACKGROUND OF THE INVENTION

The present invention relates to a mounting apparatus suitable for mounting an electrical device such as a radio, a cassette player, and the like in the dashboard of a vehicle. In particular, this invention relates to a support apparatus for automobile radios, cassette players, tuners and similar equipment suited to be firmly mounted within the dashboard of a vehicle such as a truck, automobile, or boat, and to completely hide the installed equipment and render it inaccessible when it is not in use.

As is known, various support apparatus for car radios, cassette players and tuners may be mounted on the dashboards of vehicles. These mounting devices generally consist of a fixed box structure which may be anchored within special seats made within the vehicle dashboard. A main drawback presented by the conventional mounting means for installing an electrical device within the dashboard is presented by the fact that the front part of the installed equipment is visible so that it my be seen from outside the vehicle. This, therefore, renders the piece of electrical equipment subject to theft, particularly when the vehicle is left unattended.

Accordingly, it is an object of the present invention to provide a mounting apparatus for an electrical device, such as a radio, cassette player, tuner and the like, which is suited to be firmly mounted within the dashboard of a vehicle, such as an automobile or boat, without subjecting the electrical device to the hazard of theft.

It is another object of the present invention to provide a mounting apparatus which makes it possible to completely hide and render inaccessible the equipment which has been installed, and to effectively camouflage its presence when desired.

These and other objects of the present invention, as well as the advantages thereof, will become more clear from the disclosure which follows.

SUMMARY OF THE INVENTION

In one embodiment, the present invention relates to a mounting apparatus, suitable for mounting an electrical device, such as a radio or a cassette player, within the dashboard of a vehicle which comprises at least one supporting means mounted within the vehicle dashboard for supporting the electrical device, the supporting means extending from the front to the back of the dashboard. The electrical device is mounted on a movable means which is movably mounted on the supporting means, and a motive means is provided for moving the electrical device from the front to the back of the dashboard and from the back to the front of the dashboard on the supporting means.

In this embodiment of the invention, the motive means comprises a reversible motor having a rotatable shaft operatively connected to the electrical device for to and fro movement of the device on the supporting means. A control means is electrically coupled to the motor and to the vehicle battery for moving the electrical device to the front of the dashboard when the device is to be electrically activated, and for moving the device to the rear of the dashboard when the device is to be electrically deactivated.

In a further embodiment, the present invention comprehends a mounting apparatus, suitable for mounting an electrical device in the dashboard of a vehicle, which comprises in combination: (a) at least one supporting bracket mounted within a vehicle dashboard for supporting an electrical device, the bracket having front and back ends and extending from the front to a rear region of the dashboard; (b) movable means for movably mounting an electrical device on the supporting bracket; (c) motive means for moving the movable means to and fro on the supporting bracket; (d) first control means for activating the motive means to move the movable means from the rear region of the dashboard to the front of the dashboard; and, (e) second control means for activating the motive means to move the movable means from the front of the dashboard to the rear region of the dashboard.

It will be readily understood that once the electrical device, such as the automobile radio, has been withdrawn from the front of the dashboard to the rear of the dashboard, a cavity will appear in the front of the dashboard in the position where the face of the automobile radio was once located. This cavity makes it appear to the uninformed viewer that the automobile radio has already been stolen from the vehicle or that the radio has been removed from the vehicle for repair.

In a further embodiment, the mounting apparatus may include an openable door mounted in the dashboard between the front end and the back end of the supporting bracket. This openable door will open when the electrical device, such as the radio, is moved to the front of the dashboard, and it will then close when the device is moved to the rear region of the dashboard. With this arrangement, any person who looks within the cavity which is exposed from the front of the dashboard will see the blank door and will have the impression that the radio has indeed been removed from the dashboard or that no radio is installed.

A clearer understanding of the present invention, together with further objects and advantages thereof, will be obtained from the disclosure which follows when read in conjunction with the accompanying drawings.

BRIEF DESCRIPTION OF THE DRAWINGS

FIG. 1 is a side elevational view of an embodiment of the present invention.

FIG. 2 is a front elevational view of the apparatus of FIG. 1, shown partially in section.

FIG. 3 is a partial side elevational view of another embodiment of the present invention.

DESCRIPTION OF THE PREFERRED EMBODIMENTS

Figure 4:
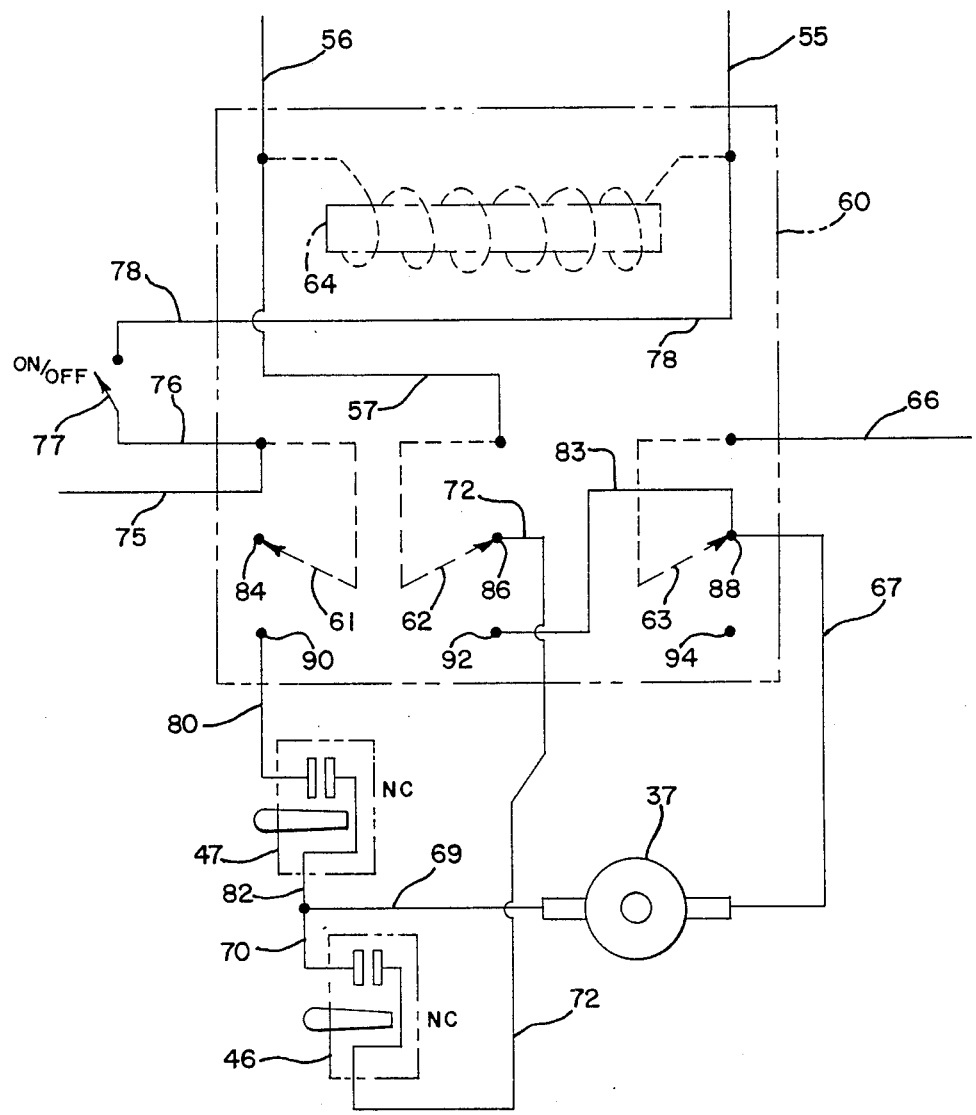
FIG. 4 is a circuit diagram illustrating one embodiment of the means for electrically operating the apparatus of the present invention.

Referring now to FIG. 1, there is shown a supporting horizontal bracket 21 which is mounted within an automobile dashboard 51 (shown in phantom) by means of a depending rear leg 22 which is attached to the inside of the dashboard by conventional attaching means not shown. The supporting horizontal bracket 21 also includes a depending front leg or end 23. An electrical device 26, such as an AM/FM automobile radio, is movably mounted on the supporting horizontal bracket 21 by means of a housing mounting bracket 31 which is attached to the housing of the electrical device 26 by means of mounting screws or bolts 32.

The housing 26 for the electrical device is shown as a box-like structure in the Figures merely for purposes of illustration. The housing is shown as an enclosed housing but it may also be an open housing such as a supporting frame or an open framework which supports the electrical chassis of the electrical device. As used hereinafter, the term "housing" is intended to include all such means for supporting the chassis of the electrical device.

Below the horizontal supporting bracket 21, which is preferably present as a pair of brackets 21, there is a pair of motor mounting brackets 34 which are shown in phantom. The rear end of each motor mounting bracket 34 is attached to the depending rear end 22 of a corresponding horizontal supporting bracket 21, and the front end of the motor mounting bracket 34 is attached to the depending front end or leg 23 of the corresponding horizontal supporting bracket 21. Referring at this point to FIG. 2, it will be seen that the motor mounting brackets 34 are located within the pair of the supporting brackets 21 and positioned below them. On the left hand side of FIG. 2, it will be seen that the front end of each motor mounting bracket 34 is bent perpendicularly around and secured to the depending front leg 23 of each supporting bracket 21 by means of a bolt 24 and a hexagonal nut 25.

In the lower right hand portion of FIG. 2 there is shown, in section, supporting bracket 21 confined within the housing mounting bracket 31 which is secured to the housing 26 by means of the mounting screws or bolts 32. It will be seen that the supporting horizontal bracket 21 is loosely confined within the housing mounting bracket 31 so that the electrical device, such as the AM/FM radio which is illustrated in FIG. 2, is slidably movable upon the supporting horizontal bracket 21.

A reversible twelve volt d.c. motor 37 is mounted below housing 26 and the horizontal supporting brackets 21 by attachment to the motor mounting brackets 34. The motor 37 is secured to the brackets 34 by means of bolts 35 which are attached to the motor and hexagonal nuts 36 which secure the motor to the brackets 34, as seen in FIGS. 1 and 2. Referring to FIG. 1, it will be seen that the reversible motor 37 contains a rotatable motor shaft 38 which is coupled to a rotatable worm driver shaft 39 by means of a flexible coupling 40. Flexible coupling 40 is provided in order to assist in aligning the worm driver shaft without placing undue pressure upon the bearings of the motor notwithstanding any mechanical misalignment of the worm driver shaft 39.

The worm driver shaft 39 extends rearwardly for a substantial distance, and it includes a rotatable shank having at least one complete thread around the pitch surface. The worm driver shaft passes through a threaded aperture contained in a driven attachment bracket 43 which is secured to the back 27 of the electrical device 26 by attaching bolts or screws 44. The threaded aperture within the driven attachment bracket 43 confines the worm driver shaft in a threaded engagement so that as the motor 37 rotates motor shaft 38 in a first rotational direction, the worm driver shaft 39 causes the driven bracket 43 to be moved in a first linear direction and thereby cause the electrical device 26 to be moved in that direction upon the supporting brackets 21. When electrical power to motor 37 is reversed, motor shaft 38 will rotate in a second rotational direction which is reversed from the first rotational direction so that the worm driver 39 causes the driven bracket 43 to be moved in a second linear direction which is opposite to the first linear direction. In this manner the electrical device 26 can be driven to and fro within the dashboard. The electrical device 26 is moved from the rear of the dashboard to the front when it is electrically activated, and it is moved from the front to the rear of the dashboard when it is electrically deactivated.

The worm driver shaft 39 is also confined within an unthreaded aperture in a worm stabilizing bracket 41 near the flexible coupling 40 which attaches the worm driver shaft 39 to the motor shaft 38. The worm stabilizing bracket 41 confines the worm driver shaft 39 in a loose fit which is sufficient to minimize vibration of the worm driver shaft as it drives the driven attachment bracket 43 to and fro. The worm stabilizing bracket 41 is attached to the motor mounting brackets 34 by conventional means not shown.

FIG. 3 illustrates an alternate embodiment for moving the electrical device 26 upon the supporting brackets 21. In FIG. 3 it will be seen that the bottom of the housing for the electrical device 26 contains a plurality of wheels or rollers 52. The wheels or rollers 52 rollably contact the upper surfaces of the horizontal supporting brackets 21 and preferably ride within a groove on the upper surfaces. The rolling contact provides for an easier means of moving the electrical device to and fro upon the horizontal supporting bracket 21. In an alternative embodiment, the wheels or rollers could be attached to the horizontal supporting brackets 21 so that the housing for the electrical device 26 rides upon the rollers on the brackets 21 in a manner similar to that of a device rolling upon a roller conveyor.

Referring again to FIG. 1, it will be seen that the apparatus also includes an openable door 49 which is swingably hinged at 50 so that when the electrical device 26 is moved upon the supporting horizontal brackets 21 in a forward motion, the front or face 28 of the electrical device will cause the openable door 49 to be swung upwardly and out of the way so that the electrical device 26 may be moved forward all the way to the front of the dashboard 51. On the other hand, when the reversible motor 37 is reversed in rotational direction, the worm driver shaft will turn in the opposite direction to cause the driven attachment bracket to move to the rear of the dashboard, thereby withdrawing the electrical device 26 from the face 51 of the dashboard to the rear of the dashboard. As the electrical device is withdrawn, the openable door 49 will swing down into a closed position. In one embodiment the door may be dropped into the closed position merely by the action of gravity, but it is also within the scope of this invention to have a torsion spring located at the hinge 50 so that the door 49 will be spring biased downwardly to make a positive closure.

In order to control the action of the motor and the forward and backward motion of the electrical device, limit switches 46 and 47 are provided on the bottom of the horizontal supporting brackets 21. Limit switches 46 and 47 are in a normally closed position. As the electrical device 26 is advanced to the front of the dashboard, the housing mounting bracket 31 will contact the front limit switch 46, thereby opening the switch 46 to disconnect the current from the motor so that the electrical device 26 will be stopped at the front 51 of the dashboard. When the electrical device 26 is withdrawn to the rear of the dashboard, the housing mounting bracket 31 will strike the rear limit switch 47 to open the electrical connection and shut off the power to the unit so that the electrical device will be stopped at the rear of the dashboard.

FIG. 4 provides a circuit diagram illustrating one embodiment of the means for electrically operating the apparatus of the present invention to move an electrical device, such as a radio, to and fro within the vehicle dashboard. FIG. 4 shows a multiple switch relay 60 containing three reed switches 61, 62, 63 and an energizable metal core 64 encompassed by a winding to provide an energizable magnet. In order to bring the radio to the front position within the dashboard in the illustrated embodiment, the accessory switch (not shown) of the vehicle must be turned on. The accessory switch is the standard vehicle switch which supplies power from the vehicle battery to auxiliary devices such as headlights, inside lights, radio, air conditioning and the like. If the radio happens to be turned on, power to the magnet 64 is provided from the antenna control circuit (not shown) by means of the conductor 55 which is coupled to the antenna control circuit. The conductor 55 couples current through the coil to energize the magnet 64 as the antenna is being raised. Current flows from the relay 60 by means of conductor 56 and returns to the battery negative. When the magnet is energized, reed switches 61, 62 and 63 are magnetically caused to make contact with the terminals 84, 86 and 88 in the relay 60. This couples power from the accessory switch through the relay by means of the conductor 66, the reed switch 63, and the conductor 67 to the reversible 12 volt motor 37. A second lead of the motor 37 is coupled via conductor 69 to limit switch 46 as shown. As a result of power coupled through the relay 60, the motor rotates the motor shaft 38 in a first direction in order to move the radio or other electrical device to the front of the vehicle dashboard. The second lead of the motor is coupled via conductors 69 and 70 to the front limit switch 46 which is in a normally closed position. The limit switch 46 is coupled via the conductor 72 to one end of the reed switch 62. The second end of the reed switch is coupled to a conductor 57 and then to a conductor 56 back to the negative of the battery. When the radio or other electrical device reaches the front of the supporting brackets 21, the limit switch 46 is contacted by the mounting bracket 31, thereby opening the circuit and stopping the forward movement of the radio.

In the event that the radio switch is not in the ON position when the accessory switch of the vehicle is turned on, no power can reach the magnet 64 from the antenna control circuit via conductor 55 in the illustrated embodiment. In order to provide for this condition, an ON/OFF switch 77 is connected to the relay 60. In this case, power from the accessory switch is coupled to the relay 60 via conductor 75 and passes to the ON/OFF switch 77 by means of conductor 76. The switch 77 is closed to the ON position, thereby allowing current to pass through conductor 78, the coil of the magnet 64 and the conductor 56 to the negative of the battery. This energizes the magnet causing the reed switch 63 to be pulled magnetically toward the magnet, thereby allowing the current to pass through the relay to activate the motor 37 in the first direction in order to bring the radio to the front of the dashboard as previously described.

In order to return the radio to the rear position within the dashboard, the accessories switch is left on but the ON/OFF switch 77 must be moved to the OFF position, thereby opening the circuit to deenergize the relay magnet 64. When this occurs, the reed switches 61, 62 and 63 will spring to the down position to contact the switch contacts 90, 92, 94. The power from the accessory switch will be coupled to the relay 60 via the conductor 75 and through the reed switch 61 to conductor 80. The current then passes through the rear limit switch 47, which is normally closed, and is coupled to the motor via the conductors 82, 69. The current is coupled via the conductor 69 to the reversible motor 37 to cause the reversible motor to rotate in a second direction which is in the opposite rotational direction to the first direction above mentioned. This causes the motor to in turn rotate the worm driver in the reverse direction, thereby bringing the radio back to the rear region of the dashboard. As the current flows through motor 37, it is coupled via conductor 67, conductor 83 and reed switch 62 through the relay 60, and via conductors 57 and 56 to the negative of the battery. When the radio reaches the rear of the dashboard, the rear limit switch 47 is contacted by the mounting bracket 31, thereby opening switch 21 to open the circuit and stop the radio at the rear of the dashboard.

The foregoing paragraphs which relate to FIG. 4 set forth only one embodiment of the circuitry which may be used for activating the reversible motor 37 to move the radio to and fro within the dashboard. In this embodiment the automobile has an antenna control circuit for raising the lowering the radio antenna, but alternative circuitry is possible. For example, the ON/OFF switch 77 could be eliminated and all power could be taken off of the accessory switch alone. Another alternative method is to use the voltage of the antenna control circuit, so that when the accessory switch is activated, the radio will move to the front of the dashboard as the antenna is raised, and when the accessory switch is deactivated the radio will move to the rear region of the dashboard as the antenna is lowered.

In light of the foregoing disclosure, further alternative embodiments of the inventive retractable radio and its control circuitry will be apparent to those skilled in the art. It is thus intended that the disclosure be taken as illustrative only, and that it not be construed to limit the invention to the embodiments disclosed. Modifications and variations may be resorted to without departing from the spirit and scope of this invention, and such modifications and variations are considered to be within the purview and the scope of the appended claims.

What is claimed is:

1. A mounting apparatus, suitable for mounting an electrical device such as a radio, a cassette player, or the like in the dashboard of a vehicle, which comprises in combination:
    (a) at least one supporting means mounted within a vehicle dashboard for supporting an electrical device, said supporting means extending from the front to the back of said dashboard;
    (b) movable means for movably mounting an electrical device on said supporting means; and
    (c) motive means for moving said movable means within said dashboard from the front to the back of said dashboard and from the back to the front of said dashboard on said supporting means.

2. A mounting apparatus according to claim 1 wherein said motive means comprises a reversible motor having a rotatable shaft operatively connected to said movable means for movement of said movable means on the supporting means, and control means for electrically coupling said motor to a vehicle battery for moving said movable means to the front of the dashboard and for moving said movable means to the rear of the dashboard.

3. A mounting apparatus according to claim 2 wherein said motive means further comprises a rotatable worm driver coupled to said rotatable shaft, said worm driver including a shank having at least one complete thread around the pitch surface, and a driven attachment means secured to said movable means and containing a threaded aperture confining said worm driver in operative threaded engagement for moving said movable means.

4. A mounting apparatus according to claim 2 further comprising an electrical device mounted upon said movable means.

5. A mounting apparatus, suitable for mounting an electrical device in the dashboard of a vehicle, which comprises in combination:
   (a) supporting means mounted within a vehicle dashboard for supporting an electrical device, said supporting means having front and back ends and extending from the front to a rear region of said dashboard;
   (b) movable means for movably mounting an electrical device on said supporting means;
   (c) motive means for moving said movable means within said dashboard from the front to the back of said dashboard and from the back to the front of said dashboard on said supporting means;
   (d) first control means for activating said motive means to move said movable means from said rear region of said dashboard to the front of said dashboard; and,
   (e) second control means for activating said motive means to move said movable means from the front of said dashboard to said rear region of said dashboard.

6. A mounting apparatus according to claim 5 further comprising an electrical device mounted upon said movable means.

7. A mounting apparatus according to claim 5 wherein said movable means is slidably mounted on said supporting means.

8. A mounting apparatus according to claim 5 further including elements providing rolling contact between said supporting means and said movable means.

9. A mounting apparatus according to claim 5 further including an openable door mounted in said dashboard for opening when said movable means is moved to the front of said dashboard and for closing when said movable means is moved to the rear region of said dashboard.

10. A mounting apparatus according to claim 5 wherein said motive means comprises a reversible d.c. motor having a rotatable shaft mechanically coupled to said movable means for moving said device to and fro.

11. A mounting apparatus according to claim 10 wherein said motive means further comprises a rotatable worm driver coupled to said rotatable shaft, said worm driver including a shank having at least one complete thread around the pitch surface, and a driven attachment means secured to said movable means and containing a threaded aperture confining said worm driver in operative threaded engagement for moving said movable means to and fro.

12. A mounting apparatus according to claim 5 wherein said first control means comprises an activation means in said vehicle for turning on d.c. power from a vehicle battery to said motive means, and a limit switch at the front end of said supporting means for shutting off power to said motive means when said limit switch is opened as said movable means reaches the front of the dashboard.

13. A mounting apparatus according to claim 12 wherein said activation means comprises an accessories switch in said vehicle for turning on d.c. power from a vehicle battery to vehicle accessories.

14. A mounting apparatus according to claim 13 wherein said activation means further comprises an on/off switch in series with said accessories switch for providing power to said motive means.

15. A mounting apparatus according to claim 5 wherein said second control means comprises an activation means in said vehicle for turning on d.c. power from a vehicle battery to said motive means, and a limit switch at the rear end of said supporting means for shutting off power to said motive means when said limit switch is opened as said movable means reaches the rear region of the dashboard.

* * * * *